United States Patent [19]

Popeil

[11] 3,754,343
[45] Aug. 28, 1973

[54] QUICK CHANGE DISPLAY FRAME
[75] Inventor: Samuel J. Popeil, Chicago, Ill.
[73] Assignee: Popeil Brothers Inc., Chicago, Ill.
[22] Filed: Aug. 12, 1971
[21] Appl. No.: 171,057

[52] U.S. Cl. ................................................ 40/155
[51] Int. Cl. ............................................. G09f 1/12
[58] Field of Search .................... 40/152, 152.1, 155

[56] References Cited
UNITED STATES PATENTS

| 3,590,510 | 7/1971 | Salz | 40/155 |
| 208,681 | 10/1878 | Hale | 40/155 |
| 2,101,500 | 12/1937 | Jagus | 40/155 |
| 3,031,047 | 4/1962 | Williams | 40/155 |

FOREIGN PATENTS OR APPLICATIONS

| 22,664 | 11/1893 | Great Britain | 40/155 |

Primary Examiner—Robert W. Michell
Assistant Examiner—Wenceslao J. Contreras
Attorney—Dominik, Knechtel & Godula

[57] ABSTRACT

A quick change display frame is shown, especially useful for removably mounting pictures, including a first triangular frame portion, a second triangular frame portion. As shown, each triangular member is identical to the other. The two triangular frame portions are interconnected by a pair of cam plates. As shown, each cam plate is identical to the other. A cam slot and pin constrains one of the triangular frame portions for arcuate movement out of planar contact with respect to the other frame portion to permit easy insertion of a preselected picture in the frame. Thereafter the frame portions are once again moved together as constrained by the cam plate action into planar contact to fix the picture or other display article in the frame.

9 Claims, 5 Drawing Figures

Patented Aug. 28, 1973
3,754,343
2 Sheets-Sheet 1
FIG.1
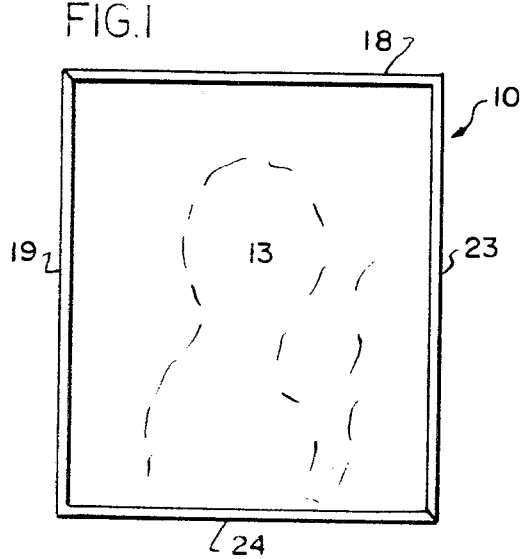
FIG.2
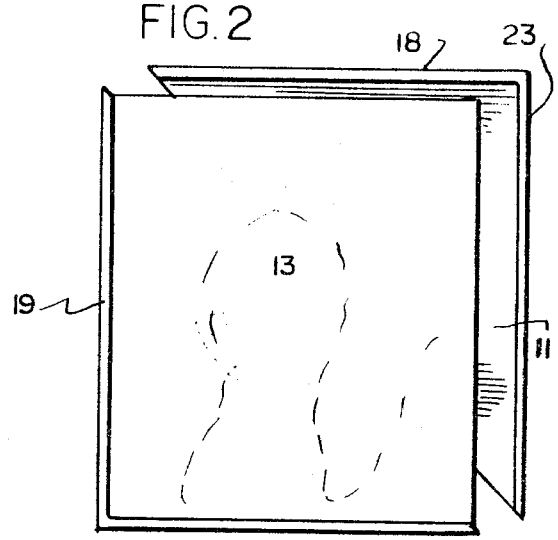
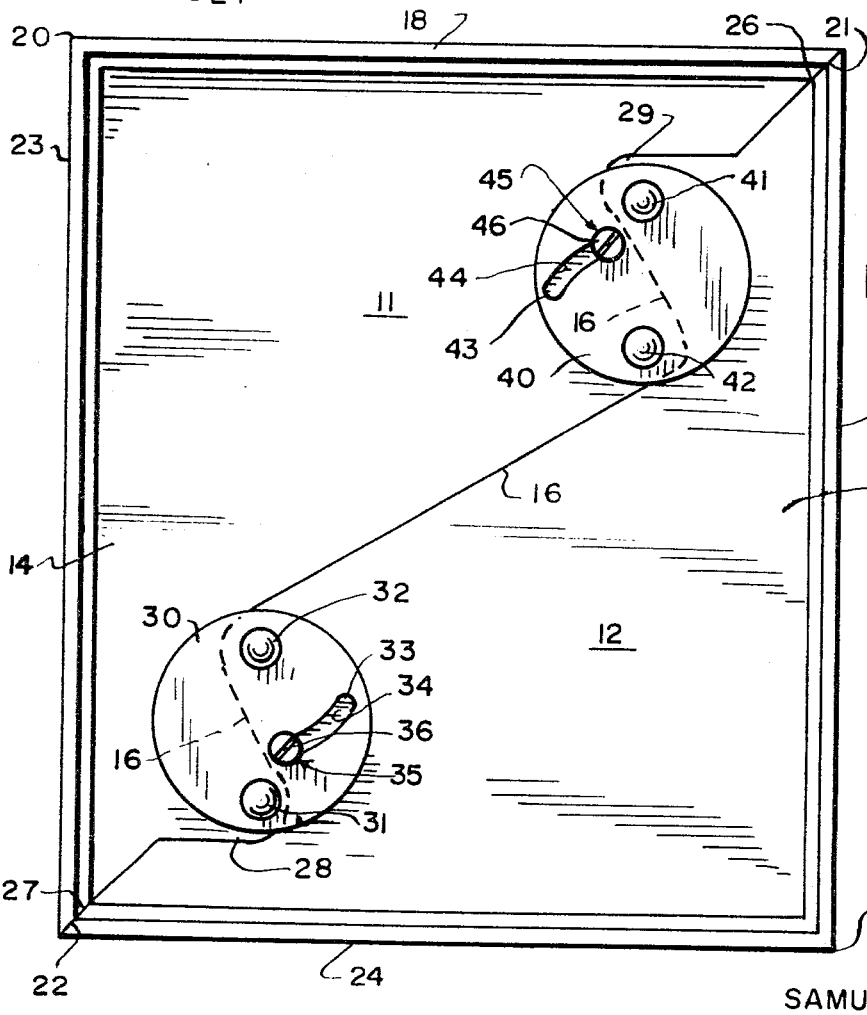
FIG. 3
INVENTOR
SAMUEL J. POPEIL
BY Dominik, Knechtel & Godula
ATTORNEYS

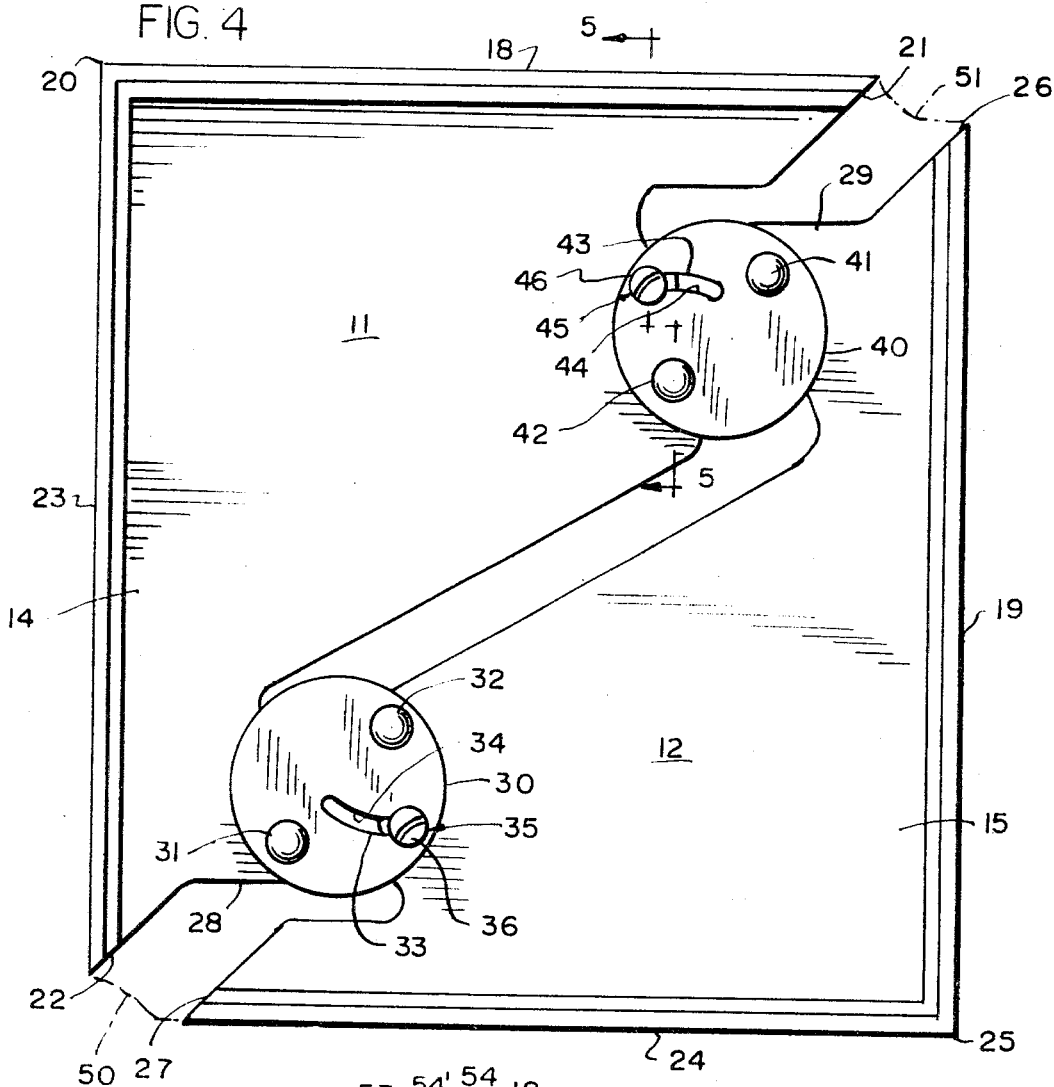

QUICK CHANGE DISPLAY FRAME

FIELD OF INVENTION

The invention is directed to a quick change display frame especially useful for mounting pictures. The simplified construction permits a user with minimum mechanical skills to easily unlock the frame assembly, insert a picture, and to thereafter easily close and secure the unit while watching the picture at all times to accurately position and center the picture. More particularly, the quick change display frame of the present invention employs a pair of triangular frame portions which are hingedly interconnected by a pair of cam plates. Cam means coact with each hinge plate whereby one frame portion is moved in an arcuate planar path away from the opposed triangular frame portion thereby unlocking the cover glass or mounting mat for the picture permitting the easy insertion of a picture. The triangular frame portions may then be easily moved back into planar contact with respect to one another, thereby securing the picture in place and by relocking the cover glass, mounting mat, or both.

BACKGROUND OF THE INVENTION

In the past, various attempts have been made to construct a picture frame assembly whereby the effort to insert a picture, or other appropriate display piece is substantially reduced. For example, U.S. Pat. No. 34,489 issued on Feb. 25, 1862, shows a picture frame assembly in which each of the four side edges of the frame may be pivoted out of engagement with respect to one another. This opens the engagement area to provide for insertion of a picture, or other display piece, after which the side edges may then be pivoted back into engagement with respect to one another to secure the display piece. Another construction for a picture frame assembly seeking to facilitate the insertion and/or removal of a picture or other display article therefrom is shown in U.S. Pat. No. 999,378 which issued on Aug. 1, 1911. In this construction, it is noted that the frame assembly is provided with four triangular corner pieces which have grooves and slots disposed therein which mate with corresponding structures on the picture frame itself. The frame is opened by removing each of the four corner pieces, inserting the picture within a frame structure, and thereafter repositioning the four corner pieces to complete assembly of the frame.

Another form of adjustable picture frame assembly is shown in U.S. Pat. No. 1,548,249 issued on Aug. 1, 1925. The construction shown in this patent is intended to provide a picture frame which is adjustable both along its height and its width in order to accommodate pictures or other display articles of varying sizes. Basically, the structure consists of an inner frame upon which four corner triangular frame portions are slidably mounted. In this manner both horizontal and vertical dimensions of the frame assembly may be varied within certain limits, to accommodate pictures of various sizes.

A further form of frame assembly constructed to simplify the insertion of a picture is shown in U.S. Pat. No. 3,200,527. The structure shown consists of a frame assembly which is hinged along its one edge and which includes snap-lock features whereby the device may be opened and closed for inserting and removing pictures or other articles therefrom.

Various other types of picture frame assemblies and other mounting structures are shown in various prior art patents presently existing. However, some of the problems encountered with such picture frame constructions include 1. an excessive number of parts which thereby increases the cost of manufacture thereby minimizing the commercial acceptability for such devices; 2. the requirement of many moving parts thereby requiring a great deal of dexterity on the part of the operator thereof in order to open all corners in order to insert a picture or other article therein, and thereafter closing all of the various corners; 3. none of the structures shown in the prior art show a frame assembly which is easily opened and closed whereby only two moving parts are moved relative to each other to provide easy access for inserting or removing the picture of other display article therein.

STATEMENT OF THE INVENTION

The present invention contemplates a quick change display frame which includes two triangular frame portions and means for hingedly interconnecting the two triangular frame portions in planar mating relation. Each triangular frame portion also includes cam means for permitting planar arcuate movement of the one triangular frame portion with respect to the other triangular frame portion, whereby the two triangular frame portions may be arcuately moved out of planar contact with respect to one another by virtue of the hinge means and cam means which permits the insertion of a picture or other display unit in the assembly and the assembly then moves back into planar contact to secure the picture of the display unit therebetween.

A principal object of the present invention is to provide a quick change display frame which not only minimizes parts, but utilizes identical parts so that the same can be manufactured inexpensively both from a standpoint of molding and assembly.

Another object of the present invention is to provide a quick change display frame in which the insertion of the photo or document is done from the front and is also closed while looking at the picture or document so that the user can visually monitor and accurately position the inserted material. A related advantage flows from this orientation in that a visual check may be made for dust, dirt, and other foreign material.

Still a further object of the invention is to provide a quick change display frame which is easy to handle for a person who is not mechanically inclined, and yet results in uniformly attractive and professional-like mountings.

Because parts are interchangeable, and more particularly the triangular identical portions of the frame, one basic mold can be provided with inserts which affords a variety of perimeter ornamentation. The use of precision molds and plastic further permits an inexpensive frame to look expensive and professional with a minimization of gaps at the corner joints.

Still another object of the invention looks to the construction of a quick change display frame which requires a minimum amount of assembly time with unskilled labor, and yet results in a sturdy frame which because of its precision will continue to isolate the photograph or document from dust and the like.

Still another object of the present invention is to provide a quick change display frame with cam means for hinging two opposed triangular members to that it is reusable almost indefinitely and may optionally utilize a back mat, or cover glass, as the user desires for his particular application.

A further detailed but desirable object of the invention flows from the use of a masking tape or pressure sensitive cement on the mat background which permits the centering of a photograph or document and temporarily secures the same against dislodgement, thus permitting constant visual monitoring of the placement and securing of the photograph or document in place.

Further, because the triangular members have frame edges, even large units can be made which open and close easily, and readily resist warpage.

Finally, the frame can be adapted to put a photo on both sides, enclose the same, and develop a stand-up display unit.

The invention, both as to its organization and method of operation, together with further objects and advantages thereof will best be understood by reference to the following specification taken in connection with the accompanying drawings in which:

FIG. 1 is a plan view showing the front surface of the quick change display frame assembly.

FIG. 2 is a front plan view showing the frame having one of the triangular portions moved out of engagement from the other triangular portion and having a mounted display disposed therein.

FIG. 3 is a plan view of the rear surface of the picture frame assembly showing the triangular frame portions, the cam plates and the cam means which cooperate with each of the cam plates.

FIG. 4 is a plan view of the rear surface of the frame showing the triangular frame portions in pulled apart relationship.

FIG. 5 is a cross sectional view taken in the direction along the line 5—5 in FIG. 4.

Referring now to the drawings, it will be noted that the frame assembly is generally referred to by the numeral 10 which is formed of two substantially triangular frame portions 11 and 12 (FIG. 3). As viewed in FIG. 1, the quick change display frame assembly 10 appears in assembled fashion and having a display article or photograph 13 mounted inside.

Each of the triangular frame portions 11 and 12 includes a base plate (14, 15) which are puzzle mated as indicated by line 16 in FIG. 3. Triangular frame portion 11 includes adjacent side edges 18 and 23 which are permanently joined together at their point of juncture 20, each of the side edges 18 and 23 being bevelled along a 45° angle at their outer opposed ends 21 and 22 respectively. Similarly, triangular frame portion 12 includes side edges 19 and 24 respectively which are joined together at their point of juncture 25, the outer edges (26, 27) of side edges 19 and 24 being similarly bevelled along a 45° angle, thereby meet and mate with the outer edges 21 and 22 of side edges 18 and 23 when in a closed position. When the parts are precision molded, the joint is hardly visible. The details of construction of the side edges will be discussed hereinafter in connection with a description of FIG. 5 of the drawings.

The preferably identical triangular frame portions 11 and 12 are hingedly secured together by means of a pair of cam plates 30 and 40 respectively. Each of the cam plates 30 and 40 are substantially identical and circular in the embodiment as shown in the drawings. Other geometric shapes may be suitable as well so long as the means of pivotally securing the cam plates 30 and 40 to the triangular frame portions 11 and 12 is in keeping with the inventive concept of the present invention. Cam plate 30 is pivotally secured to one triangular frame portion 11, along a flanged portion 28 by means of a rivet 31, and is pivotally secured to the other triangular frame portion 12, also by means of a rivet 32. Cam plate 30 further includes a cam slot 33 which is provided with a cam surface 34. Triangular frame portion 12 is provided with a pin 35 which is positioned to ride along the cam surface 34 of slot 33. The pin 35 is provided with an enlarged head 26 to prevent the pin 35 from riding out of slot 33.

The relationship of the other cam plate 40 with respect to the triangular frame portions (11, 12) is substantially similar to the construction set forth with respect to cam plate 30. It will be seen in FIG. 3 that cam plate 40 is pivotally secured to flanged portion 29 of triangular frame portion 12 by means of a first rivet 41, and is pivotally secured to triangular frame portion 11 by means of a second rivet 42. Cam plate 40 similarly includes a slot 43 having a cammed surface 44, the arcuate path of slot 43 being disposed oppositely with respect to the arcuate path of slot 33 for a purpose to be described hereinafter. Triangular frame portion 11 includes a pin 45 mounted thereon and extending upwardly from the rear surface of base plate 14 which rides in slot 43, the pin 45 having an enlarged head 46 in order to prevent the pin 45 from riding out of slot 43.

FIG. 4 of the drawings indicates the position of the triangular frame portions 11 and 12 when the same have been moved into the open position. Hence, in order for the operator to open the frame assembly 10, he would grasp each of the triangular frame portions 11 and 12 respectively, at or adjacent the points of juncture of the side edges, or at points 20 and 25 and pull the triangular frame portions 11 and 12 apart. The application of manual force to pull the triangular frame portions 11 and 12 apart thereby causes cam plate 30 to pivot about rivets 31 and 32 as pin 35 rides along the cammed surface 34 of slot 33 to the opposed end of the slot 33. Similarly, cam plate 40 simultaneously pivots about pins 41 and 42 as the pin 45 rides along the cammed surface 44 of slot 43 to the opposed end of the slot 43. The path of movement of outer edge 27 of the side edge 24, with respect to the outer end 22 of side edge 23 is indicated by the dashed line 50, and similarly, the path of other end 26 of side edge 19 with respect to the outer end 21 of side edge 18 is indicated by dashed line 51. It will be noted that both dashed lines 50 and 51 trace a planar arcuate pathway whereby side edge 19 moves downwardly and away from side edge 18 and side edge 24 moves downwardly and away from side edge 23. In this manner both the horizontal and vertical dimensions of the frame assembly are enlarged. Hence, a display article 13, may be easily inserted in the frame assembly 10 in the manner shown in FIG. 2 and subsequently the triangular frame portions 11 and 12 may then be manually pushed back into engagement whereby the reverse of the above indicated operational steps will occur and the closed position as shown in FIG. 3 is once again assumed.

At this point it will be appreciated that a mat may be inserted in front of the base plates 14, 15 upon which the photograph can be mounted. Reference to FIG. 5 illustrates such a mat 60. As referred to in the objects of the invention, a pressure sensitive surface on the mat 60 at a central portion permits prepositioning of a photograph or other document on the mat 60 to insure alignment while the frame is being closed in the manner to be described below. Additionally, to be noted on FIG. 5, is the position of a cover glass 70 over the mounting mat 60, and within the mounting slot 54 defined interiorly of the side rail 55. Here it will be further noted that on the opposite side of the frame, corresponding mounting slots 54 may be defined and a mat 60 as well as glass 70 inserted when it is desired to mount a photograph, picture, or document on both sides of the quick change frame assembly 10. After the photo or document is mounted as set forth above, closing becomes a simple function of diagonal pressure.

It becomes clear from a view of FIGS. 3 and 4 that in the closing maneuver, cam plate 30 will once again pivot about rivets 31 and 32 as pin 35 rides along the cammed surface 34 of slot 33 to the opposed end of the slot 33, while simultaneously hinge plate 40 pivots about rivets 41 and 42 as pine 45 rides along the cammed surface 44 of slot 43 to the opposed end of slot 43, thereby enabling the outer ends 21 and 26 of side edges 18 and 19 respectively, and outer ends 22 and 27 of side edges 23 and 24 respectively to meet thereby closing the frame assembly 10. While it will be observed that a fine mitered joint exists between the outer ends 21, 22 of the sides edges, at the other corners 20, 25, no such joint exists. Thus in the closed configuration a very precision-like construction appears with smooth corner joints.

In FIG. 5, the construction of the side edge 18 and its relationship with base plate 14 is shown, as well as the construction of cam plate 40, rivet 42 and the relationship of pin 45 to slot 43. It will be noted that side edge 18 consists of a side rail 55 having a front end 56 and a rear end 57. Extending inwardly from the front end 56 of side rail 55 is a retaining flange 58, which extends inwardly with respect to the outer surface of side edge 18. Spaced rearwardly from retaining flange 58 and inwardly with respect to the rear end 57 of side rail 55 is a support flange 59, which extends inwardly for a distance slightly greater than the length of retaining flange 58. Support flange 59 provides a surface upon which base plate 14 may be mounted by any appropriate means such as by adhesives, or other suitable means. The retaining flange 58 and support flange 59 are spaced sufficiently far apart to provide a clearance between the forward surface of base plate 14 and the inner surface of retaining flange 58 to accommodate the thickness of a display article 13, which is disposed therein (see FIG. 5). Hence, once the display article 13 has been inserted within the frame assembly 10, and the triangular frame portions 11 and 12 have been pushed into the closed position, the display article 13 will be retained in position by means of retaining flange 58, and the base plates 14 and 15 will provide a back surface for the display article 13.

FIG. 5 similarly discloses the manner in which hinge plate 40 is mounted on the base plate 14 by means of a rivet 42. Rivet 42 is generally circular in configuration and is mounted through hinge plate 40 and into base plate 14 in such a manner as to permit pivotal movement of cam plate 40 with respect to base plate 14. Of course, a similar construction is provided with respect to rivet 41, and rivets 31 and 32 of cam plate 30. Pin 45 is mounted on base plate 14 by any suitable means such as a thread arrangement, or by means of being riveted in place after pin 45 has been inserted to ride within slot 43. The head 46 of pin 45 insures the coaction between pin 45 and the cammed surface 44 of slot 43, thereby to provide the arcuate movement necessary to move the triangular frame portions 11 and 12 along planar arcuate paths with respect to one another, thereby to enlarge both the horizontal and vertical dimensions of the frame assembly 10 when opening the same.

In the preferred commercial embodiment of this invention, the side edges 18 and 23, 19 and 24 respectively, are formed of a plastic material, such as high impact polystyrene. Such plastics have sufficient strength and hardness to serve the purpose of a frame assembly while at the same time providing materials which are easily workable. Also the frame may be molded of aluminum and annodized to an attractive color.

In the ideal mass produced method of manufacture, the side edges 18, 23; 19, 24 and the base plates 14, 15 are all molded together in a single cavity mold. Since the two triangular members can be made identically, only a single mold form is required. The same applies to the cam plates 30, 40. When large volume runs are contemplated, this method of manufacture holds the cost of the completed frame at close to the irreducible minimum.

In an alternative method of manufacture, the side edges are extruded from the plastic materials mentioned above. In this manner, the side edges such as 18, 23 and 19,24 respectively, may be cut to single pieces of virtually any length and then mitered at their joints 20 and 25. The base plates 14 and 15 may similarly be formed of the same types of plastic materials and are ideally cut from such sheets of plastic materials by any suitable cutting means in order to provide the puzzle type mating arrangement as shown in FIGS. 3 and 4 of the drawings. Similarly, the rivets 31, 32; 41 and 42 respectively, may be plastic rivets and suitably secured in place by known methods of manufacture. Pins 35 and 45 may be of a plastic material, or may be ordinary wood screws which may be screwed into appropriate openings provided in the respective base plates 14, 15. Alternatively, the pins 35, 45 may be formed of a plastic material and may be riveted into position by inserting the pins 35, 45 through the slots 33, 43 respectively, after which the pins 35, 45 are riveted into position. In this manner, coaction between the pins 35, 45 with the corresponding slots 33, 43 is assured.

In accordance with the above description, it is clear that there has been provided by virtue of the present invention a quick change frame assembly which is of simplified construction and which greatly facilitates the ability of an operator to open the frame assembly for the insertion of a display article therein, after which the frame assembly may be easily closed once again. In addition, the number of moving parts has been greatly reduced as compared to prior art devices, and as a result, the costs related to manufacturing such frame assemblies are accordingly reduced. Furthermore, the frame assembly of the present invention opens in a manner whereby both the horizontal and vertical dimensions of the frame assembly are enlarged to permit the easy insertion of display articles therein, due to the hinge plate and cam means manner of securing the frame portions together and providing for planar arcuate movement of one frame portion with respect to the opposing frame portion.

What is claimed is:

1. A quick change display frame comprising in combination,
  a first unitary triangular frame portion including a base and a side wall mounted on the perimeter of said base,
  a second unitary triangular frame portion including a base having a side wall mounted on the perimeter of said base,
  the respective bases of said first and second unitary triangular frame portions and the outer edges of the respective side walls thereof being in planar mating relation,
  the edge of the base of each of said traangular frame portions including a pocket adjacent one end and a flared portion adjacent the opposed end thereof, whereby the flared portion of one triangular frame mates with the pocket of the opposed triangular frame portion to accommodate the planar mating contact of each of said first and second triangular frame portions, when moved into the closed position,
  cam means pivotally interconnecting the base of said first triangular frame portion,
  said cam means including a pivotal cam member to provide arcuate movement of said first and second unitary triangular frame portions with respect to one another,
  said cam means permitting said side walls of one triangular frame portion to move diagonally with respect to the adjacent side walls of the opposed triangular frame portion along an arcuate planar path,
  whereby said first triangular frame portion may be moved away from said second triangular frame portion, due to the cam means and pivotal cam member thereof, and thereby causing the respective side walls of the one triangular frame portion to move diagonally away from the adjacent side walls of the opposed triangular frame portion, thereby to permit the insertion of a display unit in said assembly, the display unit resting upon the respective bases of the triangular frame portions, and thereafter, the first and second triangular frame portions being moved toward one another whereby the side walls of the respective triangular frame portions come, once again, into contact to securely hold the display unit therebetween.

2. The frame assembly as set forth in claim 1, wherein said hinge means comprises a pair of cam plates, each of said cam plates being pivotally mounted adjacent the leading edge of the pocket of the base plate of one triangular frame portion and adjacent one side thereof and pivotally mounted to the apex of the flared portion of the base plate of the opposed triangular frame portion, thereby permitting planar movement of said triangular frame portions with respect to each other.

3. The frame assembly as set forth in claim 2 wherein said cam means comprises an arcuate slot disposed in each of said cam plates, and a slot pin mounted on the base plate of each of said frame portions and positioned to ride in a corresponding slot, said slots in said respective cam plates being disposed in opposed arcuate relationship with respect to each other thereby to permit pivotal arcuate movement of said first triangular frame portion with respect to said second triangular frame portion.

4. The frame assembly as set forth in claim 1 in which the two triangular members are identical in form.

5. A frame display unit assembly, comprising in combination,
  a first triangular frame portion including a base and a side wall mounted on the perimeter of said base and extending above and below said base in normal relation thereto,
  a second triangular frame portion including a base and a side wall mounted on the perimeter of said base and extending above and below said base in normal relation thereto,
  a pair of cam plates,
  each of said cam plates having a pivotal mounting on said base of said first triangular frame portion and a pivotal mounting on said base of said second triangular frame portion thereby interconnecting said first and second triangular frame portions in constrained pivotal relationship with respect to each other,
  each cam plate having an arcuate slot disposed therein,
  each base of each triangular frame portion having a slot pin mounted therein positioned to ride in the corresponding arcuate slot of the corresponding cam plate,
  said slots in said respective cam plates being disposed in opposed arcuate relationship with respect to each other thereby permitting pivotal arcuate movement of said first triangular frame portion with respect to said second triangular frame portion,
  whereby said first and second triangular frame portions may be pivoted into and out of planar mating contact with respect to each other to open and close the frame assembly to permit the insertion and removal of display units from engaged relation between respective side walls thereof.

6. The frame assembly as set forth in claim 5, wherein the base of each triangular frame portion includes a pocket adjacent one end thereof and a flared portion adjacent the opposed end thereof, whereby the flared portion of one triangular frame portion mates with the pocket of the opposed triangular frame portion so as to accommodate planar mating contact of said triangular frame portions in the closed position.

7. The frame assembly as set forth in claim 5, wherein said side walls and said base together form a T-shaped configuration in cross section, and each of said side walls further includes a retention flange mounted thereon in spaced relation from said base surface, thereby providing an engagement pocket therebetween for engaging and retaining a display unit therein when said frame portions are closed in mating relation contact.

8. The frame assembly as set forth in claim 7, wherein both side walls on opposite portions of the T-shaped member have a retention flange to permit mounting on both sides of the frame.

9. The frame assembly as set forth in claim 5, wherein the two triangular members are identical in form.

* * * * *